US012700591B2

(12) United States Patent
Lee et al.

(10) Patent No.: US 12,700,591 B2
(45) Date of Patent: Aug. 4, 2026

(54) POSITIVE ELECTRODE AND LITHIUM-SULFUR BATTERY COMPRISING SAME

(71) Applicant: LG Energy Solution, LTD., Seoul (KR)

(72) Inventors: Dongwook Lee, Daejeon (KR); Taek Gyoung Kim, Daejeon (KR)

(73) Assignee: LG Energy Solution, LTD., Seoul (KR)

( * ) Notice: Subject to any disclaimer, the term of this patent is extended or adjusted under 35 U.S.C. 154(b) by 598 days.

(21) Appl. No.: 17/790,931

(22) PCT Filed: Sep. 3, 2021

(86) PCT No.: PCT/KR2021/011951
§ 371 (c)(1),
(2) Date: Jul. 5, 2022

(87) PCT Pub. No.: WO2022/050769
PCT Pub. Date: Mar. 10, 2022

(65) Prior Publication Data
US 2023/0043533 A1 Feb. 9, 2023

(30) Foreign Application Priority Data

Sep. 4, 2020 (KR) ........................ 10-2020-0113260

(51) Int. Cl.
*H01M 4/583* (2010.01)
*H01M 4/02* (2006.01)
*H01M 10/052* (2010.01)

(52) U.S. Cl.
CPC ......... *H01M 4/583* (2013.01); *H01M 10/052* (2013.01); *H01M 2004/028* (2013.01)

(58) Field of Classification Search
CPC .............. H01M 4/583; H01M 10/052; H01M 2004/028; H01M 4/362; H01M 4/36;
(Continued)

(56) References Cited

U.S. PATENT DOCUMENTS

2013/0309572 A1* 11/2013 Zhang ................... H01M 4/625
429/231.95
2014/0295311 A1 10/2014 Lipka et al.
(Continued)

FOREIGN PATENT DOCUMENTS

CN 107452948 A * 12/2017 ........ H01M 10/0525
CN 111048762 4/2020
(Continued)

OTHER PUBLICATIONS

Yueying Peng, Bing Li, Yunhui Wang, Xinyi He, Jianxing Huang, and Jinbao Zhao ACS Applied Materials & Interfaces 2017 9 (5), 4397-4403 DOI: 10.1021/acsami.6b06890 (Year: 2017).*
(Continued)

*Primary Examiner* — Matthew T Martin
*Assistant Examiner* — Kevin Song
(74) *Attorney, Agent, or Firm* — Bryan Cave Leighton Paisner LLP

(57) ABSTRACT

A positive electrode comprising a current collector and a positive electrode active material layer disposed on at least one surface of the current collector, and a lithium-sulfur battery comprising the positive electrode are provided. The positive electrode active material layer comprises a positive electrode active material and an additive, and the additive comprises a transition metal-ferrocyanide compound.

10 Claims, 3 Drawing Sheets

(58) Field of Classification Search
CPC ............ H01M 4/62; H01M 4/02; H01M 4/13; H01M 4/136; H01M 4/1397; H01M 4/364; H01M 4/366; H01M 4/38; H01M 4/382; H01M 4/58; H01M 4/5815; H01M 4/60; H01M 4/625; H01M 10/42; Y02E 60/10

See application file for complete search history.

(56) References Cited

U.S. PATENT DOCUMENTS

| | | | |
|---|---|---|---|
| 2016/0028078 A1 | 1/2016 | Kim et al. | |
| 2016/0164103 A1 | 6/2016 | Son et al. | |
| 2016/0190561 A1 | 6/2016 | Son et al. | |
| 2017/0358800 A1 | 12/2017 | Sun et al. | |
| 2020/0119331 A1 | 4/2020 | Han et al. | |
| 2020/0259169 A1* | 8/2020 | Cho | H01M 4/364 |
| 2021/0104741 A1 | 4/2021 | Han et al. | |
| 2021/0202979 A1 | 7/2021 | Sakamoto et al. | |
| 2021/0273225 A1 | 9/2021 | Ye et al. | |

FOREIGN PATENT DOCUMENTS

| | | | |
|---|---|---|---|
| JP | 2011518743 | | 6/2011 |
| JP | 2015-515081 A | | 5/2015 |
| JP | 2016115417 | | 6/2016 |
| JP | 2019-200951 A | | 11/2019 |
| KR | 10-2013-0121515 A | | 11/2013 |
| KR | 10-2016-0012558 A | | 2/2016 |
| KR | 10-2016-0037084 A | | 4/2016 |
| KR | 10-2016-0046775 A | | 4/2016 |
| KR | 10-2017-0139761 A | | 12/2017 |
| KR | 20190057923 A | * | 5/2019 ............ C01B 32/21 |
| KR | 10-2020-0008437 A | | 1/2020 |
| KR | 10-2020-0008494 A | | 1/2020 |
| KR | 20200032661 | | 3/2020 |
| KR | 10-2097082 B1 | | 4/2020 |
| WO | 2009114314 | | 9/2009 |
| WO | 2013-157660 A1 | | 10/2013 |
| WO | 2020166870 | | 8/2020 |

OTHER PUBLICATIONS

CN107452948A Description Translated (Year: 2017).*

Koh, et al. "The Role of the Carbon Framework in Sulfur-Carbon Composite Cathodes in Li-S Batteries," Electrochimica Acta, vol. 212, Sep. 10, 2016, pp. 212-216.

Shen, et al. "Constructing a 3D compact sulfur host based on carbon-nanotube threaded defective Prussian blue nanocrystals for high performance lithium—sulfur batteries," J. Mater. Chem. A, 2020, 8, 1154-1163.

Peng et al., "Prussian Blue: A Potential Material to Improve the Electrochemical Performance of Lithium-Sulfur Batteries" ACS Appl. Mater. Interfaces (2017) 9, 5, pp. 4397-4403.

Wang et al., "Prussian Blue Analogs for Rechargable Batteries", iScience 3, May 25, 2018, pp. 110-133.

Espinal, Laura, "Porosity and Its Measurement", XP055832126A—Characterization of Materials, Second Edition, (2012), Wiley, pp. 1-9.

Li, Duo, "High Sulfur Loading Cathodes Fabricated Using Peapod-like, Large Pore Volume Mesoporous Carbon for Lithium—Sulfur Battery", XP093052458A—ACS Appl. Mater. Interfaces (2013), 5, 6, pp. 2208-2213.

* cited by examiner

POSITIVE ELECTRODE AND LITHIUM-SULFUR BATTERY COMPRISING SAME

CROSS-REFERENCE TO RELATED APPLICATION(S)

The present application is a National Stage Application of International Application No. PCT/KR2021/011951, filed on Sep. 3, 2021, which claims priority to Korean Patent Application No. 10-2020-0113260 filed on Sep. 4, 2020, the disclosures of which are incorporated herein by reference in their entireties.

FIELD OF DISCLOSURE

The present disclosure relates to a positive electrode for a lithium-sulfur battery and a lithium-sulfur battery comprising the same.

BACKGROUND

As the utilization range of lithium secondary batteries is expanded not only to portable electronic devices and communication devices, but also to electric vehicles (EV) and electric storage systems (ESS), the demand for high capacity of lithium secondary batteries used as their power sources is increasing.

The lithium-sulfur battery among various lithium secondary batteries is a battery system using a sulfur-based material including an S—S bond (sulfur-sulfur bond) as a positive electrode active material and using lithium metal, a carbon-based material in which intercalation/deintercalation of lithium ions occurs, or silicon or tin that forms an alloy with lithium as a negative electrode active material.

There is an advantage that sulfur, which is the main material of the positive electrode active material in the lithium-sulfur battery, has a low atomic weight, is very rich in resources and thus easy to supply and receive, and is cheap, non-toxic and environmentally friendly.

In addition, the lithium-sulfur battery has a theoretical discharging capacity of 1,675 mAh/g derived from a conversion reaction of lithium ion and sulfur ($S_8+16Li^++16e^- \rightarrow 8Li_2S$) in the positive electrode, and when using lithium metal (theoretical capacity: 3,860 mAh/g) as a negative electrode, has a theoretical energy density of 2,600 Wh/kg. Since the energy density of the lithium-sulfur battery is much higher than the theoretical energy density of other battery systems currently under study (Ni-MH battery: 450 Wh/kg, Li—FeS battery: 480 Wh/kg, Li—MnO$_2$ battery: 1,000 Wh/kg, Na—S battery: 800 Wh/kg) and the lithium secondary battery (250 Wh/kg), the lithium-sulfur battery is attracting attention as a high-capacity, eco-friendly and low-cost lithium secondary battery among secondary batteries that have been developed to date, and is a next-generation battery system to which several studies are being conducted.

Despite these advantages, the lithium-sulfur battery has a problem in that it is difficult to secure battery performance and operation stability due to lithium polysulfide generated during charging/discharging. Specifically, the lithium-sulfur battery generates lithium polysulfides (Li$_2$S$_x$, x=2 to 8) in the positive electrode during the discharging process, some of which is easily dissolved in the electrolyte and eluted from the positive electrode, resulting in loss of the positive electrode active material and thus causing a decrease in the electrochemical reactivity of the positive electrode and a decrease in the capacity and cycle life of the battery.

Also, there is a problem that the eluted lithium polysulfide increases the viscosity of the electrolyte, thereby reducing the lithium ions transport ability and thus resulting in low capacity during high-rate discharging. In addition, the lithium polysulfides diffused to the negative electrode through the electrolyte cause various side reactions with the negative electrode active material or negative electrode current collector. Further to this, the lithium polysulfides cause a shuttle reaction during the charging process, thereby greatly reducing the charging/discharging efficiency.

Accordingly, various techniques have been proposed to solve the problem of elution of the lithium polysulfides in the lithium-sulfur battery.

For example, Korean Patent Publication No. 2017-0139761 discloses that the capacity and cycle life of a battery can be improved by providing a positive electrode active material layer and a protective layer, which contain a nitrogen-doped carbon material, and incorporating chitosan as a binder into the positive electrode active layer, thereby delaying the elution of lithium polysulfide.

In addition, Korean Patent Publication No. 2016-0046775 discloses that the cycle characteristics of the battery can be improved by providing a positive electrode coating layer made of amphiphilic polymer on a part of the surface of the active part of the positive electrode including sulfur-carbon composite to inhibit elution of lithium polysulfide and to facilitate the movement of lithium ions.

In addition, Korean Patent Publication No. 2016-0037084 discloses that the lithium polysulfide can be prevented from dissolving out, and the conductivity of the sulfur-carbon nanotube composite and the loading amount of sulfur can be increased, by coating graphene on carbon nanotube aggregates containing sulfur.

In these patents, the problem of deteriorated performance or cycle life of the lithium-sulfur battery have been improved to some extent by introducing a material capable of adsorbing the lithium polysulfide to the positive electrode as an additive or in the form of coating layer, or by changing the material or structure of the positive electrode, and thereby preventing the elution of lithium polysulfide and the loss of sulfur due to the elution. However, the effect has not been sufficient. In addition, the method proposed in these patents is not only complicated, but also has a problem that the amount of sulfur that can be added (i.e., the loading amount) is limited. Therefore, it is still necessary to develop a lithium-sulfur battery having excellent performance by improving the electrochemical reactivity of the positive electrode while effectively suppressing the elution of lithium polysulfide.

RELATED ARTS

Korean Patent Publication No. 2017-0139761 published Dec. 20, 2017 and entitled "Cathode for metal-sulfur battery having cathode active material layer containing N-doped carbon and protective film,"

Korean Patent Publication No. 2016-0046775 published Apr. 29, 2016 and entitled "Cathode for lithium-sulfur battery and method of preparing the same,"

Korean Patent Publication No. 2016-0037084 published Apr. 5, 2016 and entitled "Sulfur-carbon nanotube complex, method of preparing the same, cathode active material for lithium-sulfur battery including the same and lithium-sulfur battery including the same."

SUMMARY

Accordingly, as a result of conducting various studies to solve the above problems, the inventors of the present disclosure have confirmed that when a positive electrode for a lithium-sulfur battery comprises a transition metal-ferrocyanide compound as an additive, not only the elution of lithium polysulfide may be suppressed, but also the electrochemical reactivity of the positive electrode may be improved, thereby improving the capacity and cycle life of the lithium-sulfur battery, and thus have completed the present disclosure.

Therefore, it is an object of the present disclosure to provide a positive electrode for a lithium-sulfur battery having an effect of inhibiting the elution of lithium polysulfide and an improved electrochemical reactivity of the positive electrode.

In addition, it is another object of the present disclosure to provide a lithium-sulfur battery including the positive electrode.

In order to achieve the above objects, the present disclosure provides a positive electrode for a lithium-sulfur battery comprising a current collector and a positive electrode active material layer disposed on at least one side of the current collector, wherein the positive electrode active material layer comprises a positive electrode active material and an additive, and the additive comprises a transition metal-ferrocyanide compound.

The transition metal-ferrocyanide compound may comprise at least one selected from the group consisting of iron(III) ferrocyanide, cobalt(II) ferrocyanide, nickel(II) ferrocyanide, copper(II) ferrocyanide, and zinc(II) ferrocyanide.

The transition metal-ferrocyanide compound may have a moisture content of 10% by weight or less.

The transition metal-ferrocyanide compound may be vacuum-dried to remove moisture in the lattice structure thereof.

The transition metal-ferrocyanide compound may be contained in an amount of 1 to 20% by weight based on 100% by weight of the total of the positive electrode active material layer.

The positive electrode active material may comprise a sulfur-carbon composite.

In addition, the present disclosure provides a lithium-sulfur battery comprising the positive electrode for the lithium-sulfur battery.

Advantageous Effects

The positive electrode for the lithium secondary battery according to the present disclosure has an excellent lithium polysulfide adsorption effect by comprising a transition metal-ferrocyanide compound as an additive, and also enables the realization of a lithium-sulfur battery having a high capacity and high energy density by improving the electrochemical reactivity of the positive electrode active material and maximizing the capacity expression of the positive electrode.

DETAILED DESCRIPTION

Figure 1:
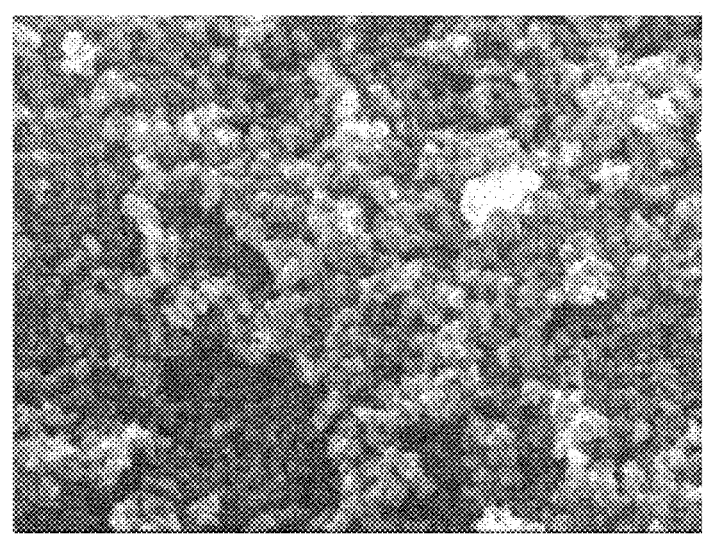
FIG. 1 is an image from a scanning electron microscope of iron (III) ferrocyanide according to Preparation Example 1 of the present disclosure.

Hereinafter, the present disclosure will be described in more detail.

The terms and words used in the present specification and claims should not be construed as limited to ordinary or dictionary terms, and should be construed in a sense and concept consistent with the technical idea of the present disclosure, based on the principle that the inventor can properly define the concept of a term to describe his invention in the best way possible.

The terminology used herein is for the purpose of describing particular embodiments only and is not intended to be limiting of the invention. The singular forms "a," "an," and "the" include plural referents unless the context clearly dictates otherwise. It is to be understood that the terms "comprise" or "have" as used in the present specification, are intended to designate the presence of stated features, numbers, steps, operations, components, parts or combinations thereof, but not to preclude the possibility of the presence or addition of one or more other features, numbers, steps, operations, components, parts, or combinations thereof.

The term "composite" as used herein refers to a material that two or more materials are combined to express a more effective function while forming physically and chemically different phases to each other.

The term "polysulfide" as used herein is a concept comprising both "polysulfide ions ($S_x^{2-}$, x=8, 6, 4, 2))" and "lithium polysulfide ($Li_2S_x$ or $LiS_x^-$, x=8, 6, 4, 2)".

The lithium-sulfur battery, among various secondary batteries, has high theoretical discharging capacity and theoretical energy density, and sulfur, used as a main material of the positive electrode active material, is rich in reserves and is inexpensive and environmentally friendly, and thus the lithium-sulfur battery is in the spotlight as a next generation battery.

As discharging proceeds in the lithium-sulfur battery, sulfur, which is a positive electrode active material, continuously reacts with lithium ions, and thus the cyclic $S_8$ is continuously converted into lithium polysulfides $Li_2S_x$, x=8, 6, 4, 2) having a linear structure. When the lithium polysulfides are completely reduced, lithium sulfide ($Li_2S$) is finally produced. Among the lithium polysulfides which are the intermediate products of this sulfur reduction reaction (discharging), lithium polysulfides ($Li_2S_x$, usually x>4), which has the high oxidation number of sulfur, are substances with a strong polarity, and are easily dissolved in the electrolyte comprising a hydrophilic organic solvent and thus causes a problem that it is eluted out of the reactive region of the positive electrode.

Despite advantages as described above, since the amount of sulfur involved in the electrochemical reaction is sharply reduced due to this elution of the lithium polysulfide, the lithium-sulfur battery does not realize all of the theoretical capacity and energy density in actual operation. Also, the elution of the lithium polysulfide increases a viscosity of the electrolyte, thereby reducing the conductivity of lithium ions and deteriorating high-rate characteristics. In addition, the eluted lithium polysulfide reacts with lithium in the negative electrode and form solid lithium sulfide on the surface of the negative electrode. There is a problem that the solid lithium sulfide does not decompose even during charging, so it acts as an irreversible capacity, and interferes with the electrochemical reaction on the surface of the negative electrode, thereby accelerating the deterioration of capacity and cycle life characteristics. In addition, there is a problem that the lithium polysulfide is not completely reduced while shuttling between the positive electrode and the negative electrode and undergoes a cycle reaction that consumes electrons, thereby reducing charging/discharging efficiency.

Due to the above-mentioned problems, the lithium-sulfur battery has a high initial capacity when actually operated, but as the cycle is progressed, the capacity and charging/discharging efficiency characteristics are rapidly deteriorated, and thus since the cycle life is also shortened, it is difficult to secure sufficient performance and operation stability, so it has not been commercialized.

In order to solve these problems, in the prior art, a method of introducing a material capable of inhibiting the elution of the lithium polysulfide into the positive electrode or separator in the form of an additive or a protective layer or a method of changing the structure or material of the positive electrode active material has been proposed. However, there are disadvantages that such a method is not only insufficient in improving the effect of the elution of the lithium polysulfide, but also has limitations in the amount of loading of sulfur, causes serious problems in the stability of the battery or is inefficient in view of the process.

Accordingly, the present disclosure provides a positive electrode for a lithium secondary battery including metal cyanide as an additive, in order to improve the elution of lithium polysulfide and the deterioration of the electrochemical reactivity of the positive electrode due to this problem, and thus to secure the effect of improving the capacity and cycle life characteristics of a lithium secondary battery comprising the same.

Specifically, the positive electrode for the lithium-sulfur battery according to the present disclosure comprises a current collector and a positive electrode active material layer disposed on at least one surface of the current collector, wherein the positive electrode active material layer comprises a positive electrode active material and an additive and wherein the additive comprises a transition metal ferrocyanide.

The positive electrode may comprise a positive electrode current collector and a positive electrode active material layer formed on one or both sides of the positive electrode current collector.

The positive electrode current collector supports the positive electrode active material and is not particularly limited as long as it has high electrical conductivity without causing chemical change in the battery. For example, copper, stainless steel, aluminum, nickel, titanium, palladium, sintered carbon; copper or stainless steel surface-treated with carbon, nickel, silver or the like; aluminum-cadmium alloy or the like may be used as the positive electrode current collector.

The positive electrode current collector may have fine irregularities(ribs) formed on its surface to enhance the bonding strength with the positive electrode active material, and may be formed in various forms such as film, sheet, foil, mesh, net, porous body, foam, nonwoven fabric or the like.

The positive electrode active material layer may comprise a positive electrode active material and an additive.

In the present disclosure, the positive electrode active material comprises a porous carbon material and a sulfur-including carbon composite including sulfur on at least a portion of the inner and outer surfaces of the porous carbon material. In the case of sulfur included in the positive electrode active material, since it is not electrically conductive by itself, it is used in combination with an electrically conductive material such as carbon material. Accordingly, the sulfur is included in the form of a sulfur-carbon composite.

The sulfur may comprise at least one selected from the group consisting of elemental sulfur ($S_8$) and sulfur compounds. The positive electrode active material may comprise at least one selected from the group consisting of inorganic sulfur, $Li_2S_n(n\geq1)$, disulfide compounds, organosulfur compounds, and carbon-sulfur polymers (($(C_2S_x)_n$, x=2.5 to 50, $n\geq2$). Preferably, the sulfur may be inorganic sulfur.

The sulfur-carbon composite comprises a porous carbon material that not only provides a framework in which the above-described sulfur may be uniformly and stably fixed, but also compensates for the low electrical conductivity of sulfur so that the electrochemical reaction can proceed smoothly.

The porous carbon material can be generally produced by carbonizing precursors of various carbon materials. The porous carbon material comprises uneven pores therein, the average diameter of the pores is in the range of 1 to 200 nm, and the porosity may be in the range of 10 to 90% of the total volume of the porous carbon material. If the average diameter of the pores is less than the above range, the pore size is only at the molecular level and impregnation with sulfur is impossible. On the contrary, if the average diameter of the pores exceeds the above range, the mechanical strength of the porous carbon material is weakened, which is not preferable for application to the manufacturing process of the electrode.

The shape of the porous carbon material is in the form of sphere, rod, needle, plate, tube, or bulk, and can be used without limitation as long as it is commonly used in a lithium-sulfur battery.

The porous carbon material may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); graphite such as natural graphite, artificial graphite, and expanded graphite, and activated carbon. Preferably, the porous carbon material may be carbon nanotubes.

The sulfur in the sulfur-carbon composite according to the present disclosure is located on at least any one of the inner and outer surfaces of the aforementioned porous carbon material, and for example, may exist in an area of less than 100%, preferably 1 to 95%, more preferably 40 to 96% of the entire inner and outer surface of the porous carbon material. When the sulfur as described above is present on the inner and outer surfaces of the porous carbon material within the above range, the maximum effect in terms of an electron transfer area and wettability with an electrolyte may be exhibited. Specifically, since the sulfur is thinly and evenly impregnated on the inner and outer surfaces of the porous carbon material in the above range, the electron transfer contact area can be increased during the charging/ discharging process. If the sulfur is located in an area of 100% of the entire inner and outer surface of the porous carbon material, since the porous carbon material is completely covered with sulfur, the wettability with the electrolyte is lowered and the contact property is lowered, so that it cannot receive electron transfer and cannot participate in the electrochemical reaction.

The sulfur-carbon composite may comprise the sulfur in an amount of 65 to 90% by weight, preferably 70 to 85% by weight, more preferably 72 to 80% by weight, based on 100% by weight of the sulfur-carbon composite. If the content of sulfur is less than the above-described range, as the content of the porous carbon material in the sulfur-carbon composite is relatively increased, the specific surface area is increased and thus when manufacturing the positive electrode, the content of the binder is increased. This increase in the amount of use of the binder eventually increases the sheet resistance of the positive electrode and acts as an insulator to prevent electron pass, thereby deteriorating the performance of the battery. On the contrary, if the content of sulfur exceeds the above-described range, sulfur, which cannot be combined with the porous carbon material, aggregates with each other, or is re-eluted to the surface of the porous carbon material, and thus is difficult to receive electrons, and cannot participate in electrochemical reactions, thereby resulting in loss of battery capacity.

The method for preparing the sulfur-carbon composite is not particularly limited in the present disclosure, and a method commonly used in the art may be used. For example, a method of simply mixing sulfur and the porous carbon material and then heat-treating them to form a composite may be used.

The positive electrode active material may further comprise at least one selected from a transition metal element, a group IIIA element, a group IVA element, a sulfur compound of these elements, and an alloy of these elements and sulfur, in addition to the above-described components.

The transition metal element may comprise Sc, Ti, V, Cr, Mn, Fe, Co, Ni, Cu, Zn, Y, Zr, Nb, Mo, Tc, Ru, Rh, Pd, Os, Ir, Pt, Au, Hg and the like, and the group IIIA element may comprise Al, Ga, In, Tl and the like, and the group IVA element may comprise Ge, Sn, Pb, and the like.

In the positive electrode for the lithium-sulfur battery of the present disclosure, the positive electrode active material may be contained in an amount of 50 to 95% by weight based on a total amount of 100% by weight of the positive electrode active material layer constituting the positive electrode for the lithium-sulfur battery. The content of the positive electrode active material may have a lower limit of 70% by weight or more or 85% by weight or more, and an upper limit of 99% by weight or less or 90% by weight or less. The content of the positive electrode active material may be set by a combination of the lower limit and the upper limit. If the content of the positive electrode active material is less than the above range, the relative content of auxiliary materials such as the electrically conductive material and the binder is increased, and the content of the positive electrode active material is reduced, making it difficult to implement a battery having a high capacity and high energy density. On the contrary, if the content of the positive electrode active material exceeds the above range, there is a problem that the content of the electrically conductive material or binder to be described later is relatively insufficient, so that the physical properties of the electrode are deteriorated.

The positive electrode for lithium-sulfur battery of the present disclosure comprises a transition metal-ferrocyanide compound as an additive in the positive electrode active material layer.

The transition metal-ferrocyanide compound contains a transition metal cation and a ferrocyanide anion represented by $[Fe(CN)_6]^{4-}$, and is a material having a uniform lattice structure. At this time, the transition metal cation may comprise at least one selected from the group consisting of iron (Fe), cobalt (Co), nickel (Ni), copper (Cu), and zinc (Zn).

Since the transition metal-ferrocyanide compound has a property of selectively and strongly adsorbing a polar material by the unshared electron pair contained in the transition metal cation and the ferrocyanide anion, it is possible to suppress the elution of lithium polysulfide. Accordingly, the transition metal-ferrocyanide compound can improve the capacity and cycle life of a lithium-sulfur battery by adsorbing the lithium polysulfide and thus solving the problems of the loss of sulfur caused by the elution of the lithium polysulfide and the capacity reduction therefrom in the conventional lithium-sulfur battery.

In addition, as the transition metal-ferrocyanide compound confines the lithium polysulfide in the positive electrode, the performance of the lithium-sulfur battery can be further improved by solving various problems such as the increase in the viscosity of the electrolyte, the side reaction at the negative electrode, and the shuttle phenomenon of the lithium polysulfide caused by the diffusion of the lithium polysulfide.

In addition, the transition metal-ferrocyanide compound has an open framework structure and may promote smooth movement of lithium ions. Therefore, the transition metal-ferrocyanide compound has an effect of accelerating the electrochemical reaction of sulfur in the positive electrode active material.

The transition metal-ferrocyanide compound is a material having an adsorption capacity for lithium polysulfide, and the use of a transition metal ferrocyanide compound such as Prussian blue as a carrier for a positive electrode active material of a lithium-sulfur battery is known in the prior art. However, in the case of the prior art, there was a problem that not only could an unsatisfactory lithium polysulfide adsorption effect be secured, but also the electrochemical reactivity of the positive electrode active material was lowered due to the low electrical conductivity of the transition metal ferrocyanide compound, and thus the capacity of the lithium-sulfur battery was decreased. Meanwhile, as described above, in the present disclosure, a lithium-sulfur battery having excellent capacity and cycle life characteristics can be implemented by incorporating a transition metal ferrocyanide compound as an additive for the positive electrode of the lithium-sulfur battery to prevent the elution of the lithium polysulfide and at the same time, to provide a migration path for lithium ions, and thus to improve the electrochemical reactivity with the positive electrode active material.

The transition metal-ferrocyanide compound may comprise at least one selected from the group consisting of iron (III) ferrocyanide($Fe_4[Fe(CN)_6]_3$, Prussian blue), cobalt (II) ferrocyanide($Co_2[Fe(CN)_6]$), nickel (II) ferrocyanide($Ni_2[Fe(CN)_6]$), copper (II) ferrocyanide($Cu_2[Fe(CN)_6]$) and zinc (II) ferrocyanide($Zn_2[Fe(CN)_6]$). Preferably, the transition metal-ferrocyanide compound may be iron (III) ferrocyanide.

The transition metal-ferrocyanide compound may be synthesized directly or purchased commercially. When synthesizing the transition metal-ferrocyanide compound directly, the preparation method thereof is not particularly limited in the present disclosure, and a method commonly used in the art may be used.

For example, the transition metal-ferrocyanide compound may be prepared by reacting sodium ferrocyanide ($Na_4[Fe(CN)_6]$) or potassium ferrocyanide ($K_4[Fe(CN)_6]$) with iron chloride ($FeCl_3$).

If moisture remains in the lattice structure of the transition metal-ferrocyanide compound, there is a problem that the capacity and cycle life characteristics of the lithium-sulfur battery are deteriorated prematurely. Therefore, in the case of the present disclosure, before using the transition metal-ferrocyanide compound purchased or manufactured as an additive for a positive electrode for a lithium-sulfur battery, an additional drying treatment is performed to remove moisture remaining in the lattice structure in addition to conventional drying. Accordingly, the transition metal-ferrocyanide compound may have a moisture content of 10% by weight or less, preferably 5% by weight or less.

The drying treatment may be performed according to a conventional method known in the art. It is preferable that the temperature of the said drying process is 100° C. or more, and that the time of the said drying process is 12 hours or more. The drying method may be performed through methods such as a vacuum drying method and a heat drying method, but it is preferable to use a vacuum drying method.

The transition metal-ferrocyanide compound in the positive electrode for the lithium-sulfur battery of the present disclosure may be included in an amount of 1 to 20% by weight based on 100% by weight of the total of the positive electrode active material layer. The content of the transition metal-ferrocyanide compound may have a lower limit of 1% by weight or more or 5% by weight or more, and an upper limit of 20% by weight or less or 10% by weight or less, based on 100% by weight of the total of the positive electrode active material layer. The content of the transition metal-ferrocyanide compound included as an additive may be set by a combination of the lower limit and the upper limit. If the content is less than the above range, the transition metal-ferrocyanide compound cannot be sufficiently combined with the lithium polysulfide, so the effect of inhibiting the elution of the lithium polysulfide is reduced, and the effect of improving lithium ions conductivity cannot be secured. On the contrary, if the content exceeds the above range, the content of the positive electrode active material is relatively lowered, so that the energy density of the lithium-sulfur battery may be reduced, and as the electrically conductive structure of the positive electrode is disturbed and an overvoltage occurs, it may be difficult to operate the battery normally.

The positive electrode active material layer may further comprise an electrically conductive material and a binder in addition to the above-described components.

The electrically conductive material is a material that acts as a path, through which electrons are transferred from the current collector to the positive electrode active material, by electrically connecting the electrolyte and the positive electrode active material, and the electrically conductive material may be used without limitation as long as it has electrical conductivity.

For example, as the electrically conductive material, carbon blacks such as Super P, Denka black, acetylene black, Ketjen black, channel black, furnace black, lamp black, and thermal black; carbon derivatives such as carbon nanotubes, graphene and fullerene; electrically conductive fibers such as carbon fiber and metal fiber; carbon fluoride; metal powders such as aluminum and nickel powder; or electrically conductive polymers such as polyaniline, polythiophene, polyacetylene, and polypyrrole may be used alone or in combination.

The content of the electrically conductive material may be added in an amount of 0.01 to 30% by weight based on the total weight of the positive electrode active material layer. If the content of the electrically conductive material is less than the above range, since electron transfer between the positive electrode active material and the current collector is not easy, voltage and capacity are reduced. On the contrary, if the content exceeds the above range, the proportion of the positive electrode active material is relatively reduced, so that the total energy (amount of charge) of the battery can be reduced. Therefore, it is desirable to determine an appropriate content within the above-described range.

The binder maintains the positive electrode active material in the positive electrode current collector and organically connects between the positive electrode active materials to further increase the binding force therebetween, and any binder known in the art can be used as the binder.

For example, the binder may be any one selected from the group consisting of fluororesin-based binders comprising polyvinylidene fluoride (PVdF) or polytetrafluoroethylene (PTFE); rubber-based binders comprising styrene butadiene rubber (SBR), acrylonitrile-butadiene rubber, and styrene-isoprene rubber; cellulose-based binders comprising carboxy methyl cellulose (CMC), starch, hydroxypropyl cellulose, and regenerated cellulose; polyalcohol-based binders; polyolefin-based binders comprising polyethylene and polypropylene; polyimide-based binders; polyester-based binders; and silane-based binders, or mixtures or copolymers of two or more thereof.

The content of the binder may be added in an amount of 0.5 to 30% by weight based on the total weight of the positive electrode active material layer. If the content of the binder is less than the above range, the physical properties of the positive electrode may be deteriorated and thus the positive electrode active material, the additive and the electrically conductive material can be broken away. If the content of the binder exceeds the above range, the ratio of the positive electrode active material and the electrically conductive material in the positive electrode is relatively reduced and thus the battery capacity can be reduced. Therefore, it is preferable to determine an appropriate content of the binder within the above-described range.

In the present disclosure, the method of manufacturing the positive electrode for the lithium-sulfur battery is not particularly limited, and a method known to a person skilled in the art or various methods modified therefrom may be used.

As an example, the positive electrode for the lithium-sulfur battery may be prepared by preparing a positive electrode slurry composition comprising the above-described components and then applying the positive electrode slurry composition to at least one surface of the positive electrode current collector to form the positive electrode active material layer.

The positive electrode slurry composition comprises the positive electrode active material, the additive, the electrically conductive material, and the binder as described above, and may further comprise a solvent other than these.

As a solvent, a solvent capable of uniformly dispersing the positive electrode active material, the additive, the electrically conductive material, and the binder is used. As such a solvent, water is most preferred as an aqueous solvent. At this time, water may be a distilled water or a deionized water, but is not necessarily limited thereto, and if necessary, a lower alcohol which can be easily mixed with water may be used. Examples of the lower alcohol comprise methanol, ethanol, propanol, isopropanol, and butanol, and they may be preferably used in mixture with water.

The content of the solvent may be contained at a level of having such a concentration as to facilitate the coating, and the specific content varies depending on the coating method and apparatus.

The positive electrode slurry composition may additionally comprise, if necessary, a material commonly used for the purpose of improving its function in the relevant technical field. For example, a viscosity adjusting agent, a fluidizing agent, a filler, etc. are mentioned.

The method of applying the positive electrode slurry composition is not particularly limited in the present disclosure, and for example, methods such as doctor blade, die casting, comma coating, and screen printing may be mentioned. In addition, after molding on a separate substrate, the positive electrode slurry may be applied on the positive electrode current collector by pressing or lamination method.

After the application, a drying process for removing the solvent may be performed. The drying process is carried out at a temperature and time at a level capable of sufficiently removing the solvent, and the conditions may vary depending on the type of solvent, and thus are not particularly limited in the present disclosure. As an example, a drying method by warm air, hot air, or low-humidity air, a vacuum drying method, and a drying method by irradiation with (far)-infrared radiation or electron beam may be mentioned. The drying speed is adjusted so that the solvent can be removed as quickly as possible within the range of speed that does not cause cracks in the positive electrode active material layer due to normal stress concentration or within the range of speed at which the positive electrode active material layer does not peel off from the positive electrode current collector.

Additionally, after the drying, the density of the positive electrode active material layer in the positive electrode may be increased by pressing the current collector. Methods, such as a mold press and a roll press, are mentioned as a press method.

The porosity of the positive electrode, specifically the positive electrode active material layer manufactured by the above-described components and manufacturing method, may be 50 to 80%, preferably 60 to 75%. If the porosity of the positive electrode is less than 50%, the degree of filling of the positive electrode slurry composition comprising the positive electrode active material, the additive, and the binder becomes too high, so that the electrolyte cannot be maintained sufficiently to exhibit ion conduction and/or electric conduction between positive electrode active materials, thereby resulting in deterioration of the power characteristics or cycle characteristics of the battery and resulting in a problem that the overvoltage and the reduction in discharging capacity of the battery become severe. On the contrary, if the porosity of the positive electrode exceeds 80% and has an excessively high porosity, there is a problem that the physical and electrical connection with the current collector is lowered, resulting in a decrease in adhesion and difficulty in reaction, and there is a problem that the energy density of the battery may be lowered because the electrolyte is filled in the increased porosity. Therefore, the porosity is properly adjusted within the above range.

In particular, in the case of the positive electrode of the present disclosure, as an electrically conductive material is not separately added to the positive electrode active material layer, a larger amount of sulfur can be loaded. Therefore, in the present disclosure, the loading amount of sulfur in the positive electrode, that is, the mass of sulfur per unit area of the positive electrode active material layer in the positive electrode may be 6 to 8 mg/cm$^2$. According to such a high loading amount of sulfur, the lithium-sulfur battery comprising the positive electrode according to the present disclosure may exhibit excellent discharging capacity and cycle life characteristics.

In addition, the present disclosure provides a lithium-sulfur battery comprising the positive electrode for the lithium-sulfur battery.

The lithium-sulfur battery comprises a positive electrode, a negative electrode, and an electrolyte interposed therebetween, and the positive electrode comprises the positive electrode for the lithium-sulfur battery according to the present disclosure.

The positive electrode is as described above.

The negative electrode may comprise a negative electrode current collector and a negative electrode active material layer coated on one or both surfaces of the negative electrode current collector. Also, the negative electrode may be a lithium metal plate.

The negative electrode current collector is for supporting the negative electrode active material layer, and is the same as described for the positive electrode current collector.

The negative electrode active material layer may comprise an electrically conductive material and a binder in addition to the negative electrode active material. At this time, the binder is as described above.

The electrically conductive material is a material that electrically connects the negative electrode active material and the electrolyte to serve as a path for electrons to move from the current collector to the negative electrode active material, and may be used without limitation as long as it has electrical conductivity.

For example, as an electrically conductive material, graphite such as natural graphite or artificial graphite; carbon blacks such as Super-P, Denka black, acetylene black, Ketjen black, channel black, furnace black, lamp black, and thermal black; carbon derivatives such as carbon nanotubes and fullerenes; electrically conductive fibers such as carbon fibers and metal fibers; carbon fluoride; metal powders such as aluminum and nickel powder; or electrically conductive polymers such as polyaniline, polythiophene, polyacetylene, and polypyrrole may be used alone or in combination.

The negative electrode active material may comprise a material capable of reversibly intercalating or de-intercalating lithium (Li$^+$), a material capable of reacting with lithium ion to reversibly form lithium containing compounds, lithium metal, or lithium alloy.

The material capable of reversibly intercalating or de-intercalating lithium ion (Li$^+$) can be, for example, crystalline carbon, amorphous carbon, or a mixture thereof. The material capable of reacting with lithium ion (Li$^+$) to reversibly form lithium containing compounds may be, for example, tin oxide, titanium nitrate, or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

Preferably, the negative electrode active material may be lithium metal, and specifically, may be in the form of a lithium metal thin film or a lithium metal powder.

The method of forming the negative electrode active material is not particularly limited, and a method of forming a layer or film commonly used in the art may be used. For example, methods such as compression, coating, and deposition may be used. In addition, a case, in which a thin film of metallic lithium is formed on a metal plate by initial charging after assembling a battery without a lithium thin film on the current collector, is also included in the negative electrode of the present disclosure.

The electrolyte comprises lithium ions and is used for causing an electrochemical oxidation or reduction reaction between a positive electrode and a negative electrode through these.

The electrolyte may be a non-aqueous electrolyte solution or a solid electrolyte which does not react with lithium metal, but is preferably a non-aqueous electrolyte, and comprises an electrolyte salt and an organic solvent.

The electrolytic salt which is comprised in the non-aqueous electrolyte solution is lithium salt. The lithium salt can be used without limitation as long as it is commonly used in an electrolyte solution for a lithium secondary battery. For example, the lithium salt may be LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, lithium chloroborane, lithium lower aliphatic carboxylate, 4-phenyl lithium borate, lithium imide, etc.

The concentration of the lithium salt may be determined in consideration of ion conductivity, solubility and the like, and may be, for example, 0.1 to 4.0 M, preferably 0.5 to 2.0 M. If the concentration of the lithium salt is less than the above range, it is difficult to ensure ion conductivity suitable for operating the battery. On the other hand, if the concentration exceeds the above range, the viscosity of the electrolyte solution is increased to lower the mobility of the lithium ion and the decomposition reaction of the lithium salt itself may increase to deteriorate the performance of the battery. Therefore, the concentration is adjusted appropriately within the above range.

As the organic solvent included in the non-aqueous electrolyte, those commonly used in the electrolyte for the lithium secondary battery may be used without limitation, and for example, ethers, esters, amides, linear carbonates, cyclic carbonates, and the like may be used alone or as a mixture of two or more thereof.

In the present disclosure, the non-aqueous organic solvent comprises an ether-based compound and a heterocyclic compound containing one or more double bonds.

The ether-based compound secures electrochemical stability within the driving voltage range of the battery, while maintaining the solubility of sulfur or sulfur-based compounds, and has relatively little occurrence of side reactions with intermediate products during the operation of the battery.

The ether-based compound may comprise at least one selected from the group consisting of a linear ether compound and a cyclic ether compound, and preferably may be a linear ether compound.

For example, the linear ether compound may comprise at least one selected from the group consisting of dimethyl ether, diethyl ether, dipropyl ether, methylethyl ether, methylpropyl ether, ethylpropyl ether, dimethoxyethane, diethoxyethane, ethylene glycol ethylmethyl ether, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether and polyethylene glycol methylethyl ether. Preferably, the linear ether compound may comprise at least one selected from the group consisting of dimethoxyethane, ethylene glycol ethylmethyl ether and diethylene glycol dimethyl ether, and more preferably, may be dimethoxyethane.

For example, the cyclic ether compound may comprise at least one selected from the group consisting of 1,3-dioxolane, 4,5-dimethyl-dioxolane, 4,5-diethyl-dioxolane, 4-methyl-1,3-dioxolane, 4-ethyl-1,3-dioxolane, tetrahydrofuran, 2-methyltetrahydrofuran, 2,5-dimethyltetrahydrofuran, 2,5-dimethoxytetrahydrofuran, 2-ethoxytetrahydrofuran, 2-methyl-1,3-dioxolane, 2-vinyl-1,3-dioxolane, 2,2-dimethyl-1,3-dioxolane, 2-methoxy-1,3-dioxolane, 2-ethyl-2-methyl-1,3-dioxolane, tetrahydropyran, 1,4-dioxane, 1,2-dimethoxy benzene, 1,3-dimethoxy benzene, 1,4-dimethoxy benzene and isosorbide dimethyl ether.

The heterocyclic compound is a heterocyclic compound containing at least one double bond, and the heterocycle contains at least one hetero atom selected from the group consisting of an oxygen atom and a sulfur atom. The heterocyclic compound comprises an oxygen atom or a sulfur atom and exhibits polarity, thereby enhancing affinity with other components in the electrolyte, as well as suppressing side reactions and decomposition of the electrolyte.

The heterocyclic compound may be a 3 to 15 membered, preferably 3 to 7 membered, more preferably a 5 to 6 membered heterocyclic compound.

In addition, the heterocyclic compound may be a heterocyclic compound substituted or unsubstituted by at least one selected from the group consisting of an alkyl group having 1 to 4 carbon atoms, a cyclic alkyl group having 3 to 8 carbon atoms, an aryl group having 6 to 10 carbon atoms, a halogen group, a nitro group (—NO$_2$), an amine group (—NH$_2$), and a sulfonyl group (—SO$_2$); or a multicyclic compound of a heterocyclic compound and at least one selected from the group consisting of a cyclic alkyl group having 3 to 8 carbon atoms and an aryl group having 6 to 10 carbon atoms.

For example, the heterocyclic compound may comprise at least one selected from the group consisting of furan, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, 2-(2-nitrovinyl)furan, thiophene, 2-methylthiophene, 2-ethylthiophene, 2-propylthiophene, 2-butylthiophene, 2,3-dimethylthiophene, 2,4-dimethylthiophene and 2,5-dimethylthiophene. Preferably, the heterocyclic compound may comprise at least one selected from the group consisting of 2-methylfuran, 3-methylfuran, and 2,5-dimethylfuran, and more preferably may be 2-methylfuran.

In the present disclosure, using the ether-based compound and the heterocyclic compound in the non-aqueous organic solvent in a volume ratio of 95:5 to 5:95, preferably 95:5 to 50:50, more preferably 90:10 to 70:30, and most preferably 90:10 to 82.5:17.5 may be advantageous in terms of preventing loss of positive electrode active material and reducing ionic conductivity of a lithium-sulfur battery. In the present disclosure, the volume ratio corresponds to the ratio of "% by volume of an ether-based compound":"% by volume of a heterocyclic compound" in an ether-based solvent.

The electrolyte may further contain nitric acid or a nitrous acid-based compound as an additive, in addition to the electrolyte salts and organic solvents described above. The nitric acid or a nitrous acid-based compound has the effect of forming a stable film on the lithium metal electrode, which is a negative electrode, and improving the charging/discharging efficiency.

The nitric acid or nitrous acid-based compound is not particularly limited in the present disclosure, but may be at least one selected from the group consisting of inorganic nitric acid or nitrous acid compounds such as lithium nitrate (LiNO$_3$), potassium nitrate (KNO$_3$), cesium nitrate (CsNO$_3$), barium nitrate (Ba(NO$_3$)$_2$), ammonium nitrate (NH$_4$NO$_3$), lithium nitrite (LiNO$_2$), potassium nitrite (KNO$_2$), cesium nitrite (CsNO$_2$) and ammonium nitrite (NH$_4$NO$_2$); organic nitric acid or nitrous acid compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite, and octyl nitrite; organic nitro compounds such as nitromethane, nitropropane, nitrobutane, nitrobenzene, dinitrobenzene, nitropyridine, dinitropyridine, nitrotoluene, dinitrotoluene, and combinations thereof, and preferably, lithium nitrate is used.

The injection of the electrolyte may be performed at an appropriate stage during the manufacturing process of the electrochemical device depending on the manufacturing process and required physical properties of the final product. That is, the injection can be performed before assembling the electrochemical device or at the final stage of assembling the electrochemical device.

A separator may be additionally included between the positive electrode and the negative electrode.

The separator may be made of a porous non-conductive or insulating material that separates or insulates the positive electrode and the negative electrode from each other and enables transport of lithium ions between the positive electrode and the negative electrode. The separator may be used without special limitation as long as it is used as a separator in a conventional lithium secondary battery. The separator may be an independent member such as a film, or may comprise a coating layer added to the positive and/or negative electrodes.

It is preferable that the separator has excellent wettability to the electrolyte while having low resistance to ion migration of the electrolyte.

The separator may be made of a porous substrate, and the porous substrate may be used as long as it is a porous substrate commonly used for a secondary battery, and porous polymer films may be used alone or by laminating them, and for example, a nonwoven fabric or a polyolefin-based porous membrane made of glass fibers having a high melting point, polyethylene terephthalate fibers, etc. may be used, but is not limited thereto.

The material of the porous substrate is not particularly limited in the present disclosure, and any material can be used as long as it is a porous substrate commonly used in an electrochemical device. For example, the porous substrate may comprise at least one material selected from the group consisting of polyolefin such as polyethylene and polypropylene, polyester such as polyethyleneterephthalate and polybutyleneterephthalate, polyamide, polyacetal, polycarbonate, polyimide, polyetheretherketone, polyethersulfone, polyphenyleneoxide, polyphenylenesulfide, polyethylenenaphthalate, polytetrafluoroethylene, polyvinylidene fluoride, polyvinyl chloride, polyacrylonitrile, cellulose, nylon, poly(p-phenylene benzobisoxazole), and polyarylate.

The thickness of the porous substrate is not particularly limited, but may be 1 to 100 μm, preferably 5 to 50 μm. Although the thickness range of the porous substrate is not particularly limited to the above-mentioned range, if the thickness is excessively thinner than the lower limit described above, mechanical properties are deteriorated and thus the separator may be easily damaged during use of the battery.

The average diameter and porosity of the pores present in the porous substrate are also not particularly limited, but may be 0.001 μm to 50 μm and 10 to 95%, respectively.

The lithium secondary battery according to the present disclosure can be manufactured by lamination, stacking, and folding processes of the separator and the electrodes, in addition to the usual winding process.

The shape of the lithium secondary battery is not particularly limited, and may be various shapes such as a cylindrical shape, a laminate shape, and a coin shape.

Also, the present disclosure provides a battery module including the lithium secondary battery described above as a unit battery.

The battery module may be used as a power source for medium to large-sized devices requiring high temperature stability, long cycle characteristics, high capacity characteristics, and the like.

Examples of such medium to large-sized devices may comprise, but is not limited to, a power tool powered and moved by an electric motor; an electric car including an electric vehicle (EV), a hybrid electric vehicle (HEV), a plug-in hybrid electric vehicle (PHEV), and the like; an electric motorcycle including an electric bike (E-bike) and an electric scooter (E-scooter); an electric golf cart; a power storage system, etc.

Hereinafter, preferred examples of the present disclosure will be described in order to facilitate understanding of the present disclosure. It will be apparent to those skilled in the art, however, that the following examples are only illustrative of the present disclosure and various changes and modifications can be made within the scope and spirit of the present disclosure, and that such variations and modifications are within the scope of the appended claims.

PREPARATION EXAMPLES

Preparation Example 1

To the reactor, 100 mM aqueous iron chloride solution and 75 mM sodium ferrocyanide were added and stirred, followed by reaction at 60° C. for 30 minutes.

The reaction product obtained through the above reaction was centrifuged, washed with distilled water, and then dried at 60° C. for 12 hours to prepare iron(III) ferrocyanide.

Preparation Example 2

To the reactor, 100 mM aqueous iron chloride solution and 75 mM sodium ferrocyanide were added and stirred, followed by reaction at 60° C. for 30 minutes.

The reaction product obtained through the above reaction was centrifuged, washed with distilled water, and then dried at 60° C. for 12 hours.

Then, the dried iron(III) ferrocyanide was placed in a vacuum oven and further dried at 100° C. for 12 hours to prepare iron(III) ferrocyanide.

EXAMPLES AND COMPARATIVE EXAMPLES

Example 1

88% by weight of sulfur-carbon composite (S:CNT=70: 30(weight ratio)) as a positive electrode active material, 5% by weight of vapor grown carbon fiber (VGCF) as an electrically conductive material, and 6.5% by weight of polyacrylic acid and 0.5% by weight of polyvinyl alcohol as binders were mixed to obtain a composition, and 5% by weight of iron (III) ferrocyanide obtained in Preparation Example 1 as an additive relative to the entire composition was added to the obtained composition and mixed to prepare a positive electrode slurry composition.

The positive electrode slurry composition prepared above was coated on an aluminum current collector having a thickness of 20 μm, dried at 50° C. for 12 hours, and compressed with a roll press device to manufacture a positive electrode for a lithium-sulfur battery. At this time, the porosity of the positive electrode was 70%, the loading amount of sulfur was 6 to 8 mg/cm², and the sulfur content in the positive electrode active material layer was 61.6% by weight.

Example 2

A positive electrode for a lithium-sulfur battery was manufactured in the same manner as in Example 1 above, except that as an additive, iron (III) ferrocyanide of Preparation Example 2 is used in the same amount.

Example 3

The positive electrode prepared in Example 1 and the negative electrode were positioned to face each other, and a polyethylene separator having a thickness of 16 μm and a porosity of 46% was interposed therebetween, and 70 μl of electrolyte was injected to manufacture a lithium-sulfur battery.

At this time, a lithium metal thin film having a thickness of 45 μm was used as a negative electrode, and a mixed solution prepared by dissolving 1M concentration of lithium bis(trifluoromethanesulfonyl)imide (LiTFSI) and 1% by weight of lithium nitrate (LiNO$_3$) in an organic solvent consisting of 1,3-dioxolane and dimethyl ether (DOL: DME=1:1 (volume ratio)) was used as an electrolyte.

Example 4

A lithium-sulfur battery was prepared in the same manner as in Example 3 above, except that the positive electrode of Example 2 is used.

Comparative Example 1

A positive electrode was manufactured in the same manner as in Example 1 above, except that a positive electrode slurry composition including 88% by weight of sulfur-carbon composite (S:CNT=70:30 (weight ratio)) as a positive electrode active material, 5% by weight of vapor grown carbon fiber (VGCF) as an electrically conductive material, and 6.5% by weight of polyacrylic acid and 0.5% by weight of polyvinyl alcohol as binders was used.

Comparative Example 2

Sulfur and iron (III) ferrocyanide were mixed in a weight ratio of 70:30 along with ethanol using a ball mill, and then heat-treated at a temperature of 60° C. for 12 hours to prepare a sulfur-iron (III) ferrocyanide composite.

A positive electrode was manufactured in the same manner as in Example 1 above, except that a positive electrode slurry composition containing 88% by weight of sulfur-iron (III) ferrocyanide composite as a positive electrode active material, 5% by weight of vapor grown carbon fiber (VGCF) as an electrically conductive material, and 6.5% by weight of polyacrylic acid and 0.5% by weight of polyvinyl alcohol as binders was used.

Comparative Example 3

A lithium-sulfur battery was manufactured in the same manner as in Example 3 above, except that the positive electrode of Comparative Example 1 is used.

Comparative Example 4

A lithium-sulfur battery was manufactured in the same manner as in Example 3 above, except that the positive electrode of Comparative Example 2 is used.

Experimental Example 1. Scanning Electron Microscope Analysis

The iron(III) ferrocyanide prepared in Preparation Example 1 was observed with a scanning electron microscope (SEM). At this time, S-4800 of Hitachi company was used as a scanning electron microscope, and the result obtained is shown in FIG. 1.

Referring to FIG. 1, it can be seen that the iron (III) ferrocyanide according to Preparation Example 1 had a spherical shape and was prepared uniformly.

Experimental Example 2. Evaluation of Electrical Conductivity Characteristics For the iron (III) ferrocyanide (PB) of Preparation Example 1, the positive electrode active material (S70/CNT) of Example 1, the positive electrode active material (S70/PB) of Comparative Example 2 and the carbon nanotube (CNT) used in Example 1, electrical conductivities were measured using a powder resistance measuring instrument (HPRM-FA2, manufactured by Hantech Co., Ltd.). The results obtained at this time are shown in FIG. 2.

Figure 2:
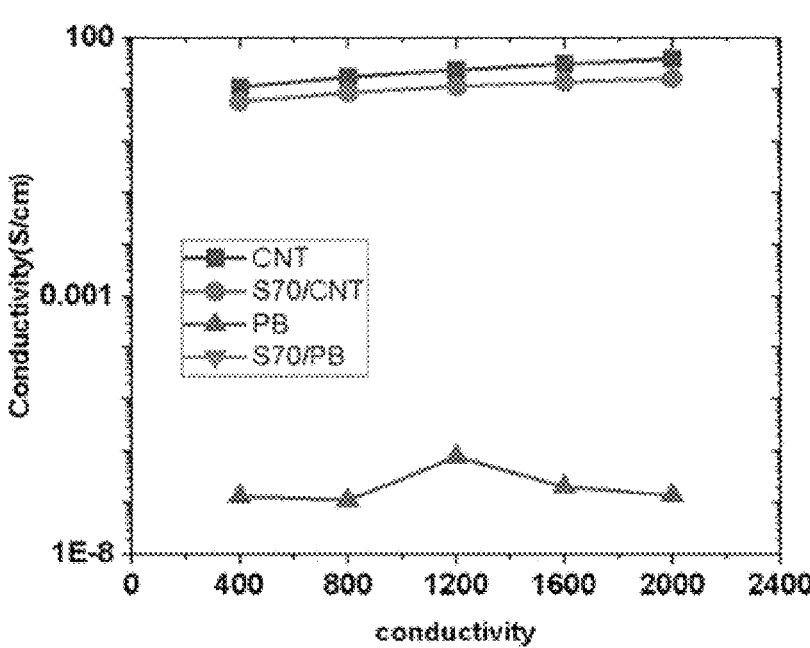
FIG. 2 is a graph showing results of the evaluation of electrical conductivity characteristics according to Experimental Example 2.

As shown in FIG. 2, it can be seen that the carbon nanotubes used for the positive electrode active material in Example 1 have very good electrical conductivity. In comparison, it can be seen that the iron (III) ferrocyanide of Preparation Example 1 has very low electrical conductivity. In addition, in the case of the positive electrode active material of Comparative Example 2, that is, the sulfur-iron (III) ferrocyanide composite, the resistance was too high to measure the electrical conductivity.

Experimental Example 3. Evaluation of Battery Performance

For the batteries manufactured in Example 3, Example 4, Comparative Example 3, and Comparative Example 4, the capacities and cycle life characteristics were evaluated using a charging/discharging measuring device (manufactured by PNE Solutions Co., Ltd.)).

Specifically, the capacity characteristics of the battery were evaluated while discharging and charging were performed at a current density of 0.1 C at 25° C. The results obtained at this time are shown in Table 1 and FIG. 3.

In addition, after repeating discharging and charging three times at a current density of 0.1 C at 25° C., discharging and charging were performed three times at a current density of 0.2 C, and then, discharging capacity and coulombic efficiency were measured while discharging and charging were performed at a current density of 0.5 C to evaluate the cycle life characteristics of the battery. The results obtained at this time are shown in Table 1 and FIG. 4.

TABLE 1

| | Average voltage | Discharging capacity (mAh/g) | |
| | (V) | 0.1 C | 0.5 C |
|---|---|---|---|
| Example 3 | 2.14 | 1218 | 942 |
| Example 4 | 2.12 | 1243 | 931 |
| Comparative Example 3 | 2.13 | 1161 | 864 |
| Comparative Example 4 | 2.15 | 1114 | 832 |

Figures 3, 4:
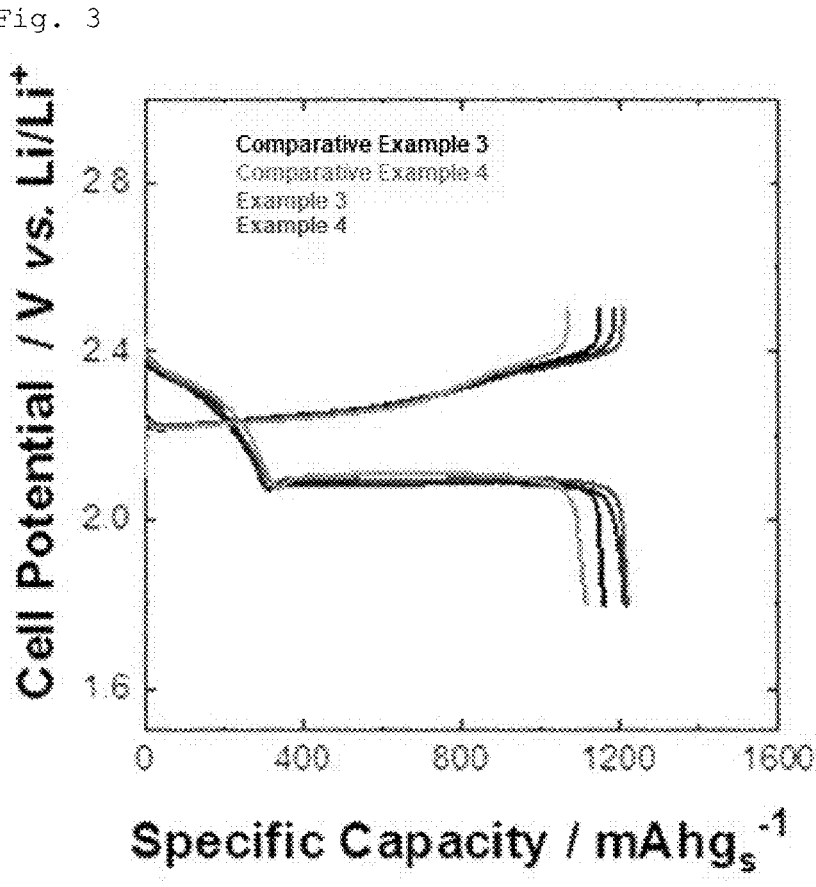
FIG. 3 is a graph showing results of performance evaluation of the lithium-sulfur batteries according to Experimental Example 3.
FIG. 4 is a graph showing results of performance evaluation of the lithium-sulfur batteries according to Experimental Example 3.

As shown in FIGS. 3 and 4 and Table 1, it can be seen that the batteries according to Examples have superior capacity and cycle life characteristics compared to Comparative Examples.

Specifically, it can be seen that the batteries of Examples 3 and 4 both have an effect of improving the capacity at a low rate (0.1 C) and a high rate (0.5 C), but in the case of Example 3, the reductions in the discharging capacity and the coulombic efficiency appear early, which is due to the moisture remaining in the additive. In particular, it can be seen that in the case of Example 4, the high-rate discharge capacity is lower than that of Example 3 by incorporating an additive subjected to additional drying treatment, but premature deterioration of performance does not occur, so it has a cycle life characteristic similar to that of the reference electrode.

Meanwhile, it can be seen that in the case of Comparative Example 3, the capacity characteristic was not good compared to Examples, and in the case of Comparative Example 4, both the capacity and the lifetime were significantly reduced.

From these results, it can be seen that if the transition metal-ferrocyanide compound as an additive is comprised in the positive electrode, the elution of the lithium polysulfide is suppressed and the reactivity of the positive electrode is increased, so that the lithium-sulfur battery has excellent capacity and cycle life characteristics.

Experimental Example 4. Evaluation of Power Characteristics for the Battery

For the batteries manufactured in Example 4 and Comparative Example 3, the power characteristics of the batteries were evaluated by applying an instantaneous discharging current of 1 C at 25° C. to measure the change in voltage. The results obtained at this time are shown in FIG. 5.

Figure 5:
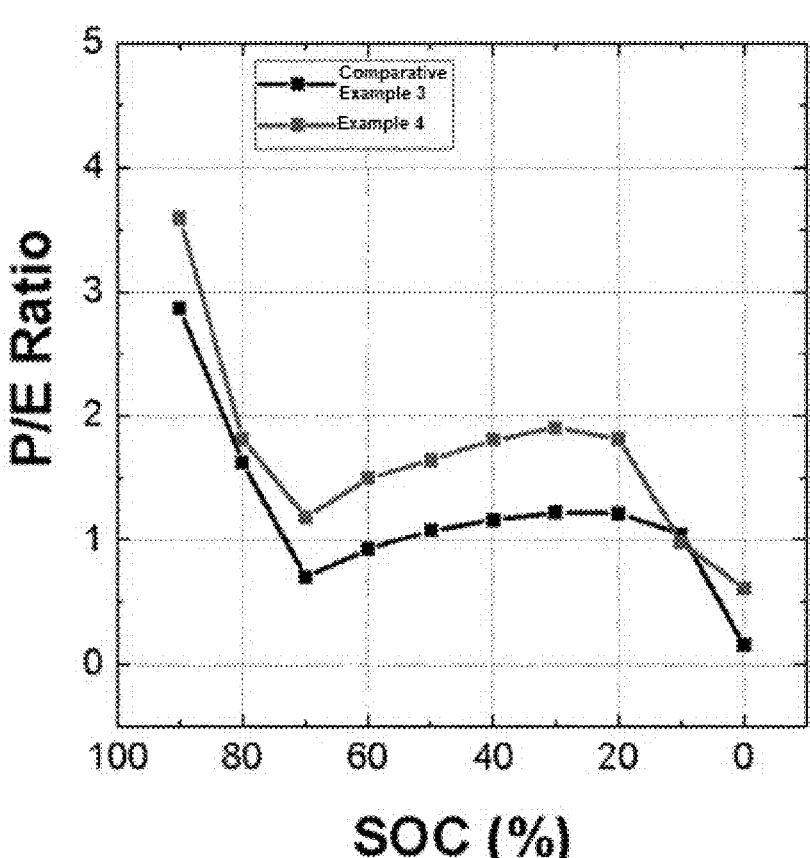
FIG. 5 is a graph showing results of evaluation of power characteristics of lithium-sulfur batteries according to Experimental Example 4.

As shown in FIG. 5, it can be seen that in the case of the battery according to Example 4, there is an effect of improving the power characteristics compared to the reference electrode in the entire section of the charge capacity (SOC), as compared to Comparative Example 3.

The invention claimed is:

1. A positive electrode for a lithium-sulfur battery, the positive electrode comprising a current collector and a positive electrode active material layer disposed on at least one side of the current collector,
   wherein the positive electrode active material layer comprises a positive electrode active material and an additive, and the additive comprises a transition metal-ferrocyanide compound,
   wherein the positive electrode active material consists of a sulfur-carbon composite,
   wherein the sulfur-carbon composite comprises a porous carbon material that provides a framework in which sulfur is fixed,
   wherein the transition metal-ferrocyanide compound is contained in the positive electrode active material layer in an amount of 1 to 20% by weight based on 100% by weight of the total of the positive electrode active material layer,
   wherein the sulfur-carbon composite comprises the porous carbon material and the sulfur in at least a portion of inner and outer surfaces of the porous carbon material, and
   wherein the transition metal-ferrocyanide compound is present as a separate additive distinct from the sulfur-carbon composite.

2. The positive electrode according to claim 1, wherein the transition metal-ferrocyanide compound comprises at least one selected from the group consisting of iron (III) ferrocyanide, cobalt (II) ferrocyanide, nickel (II) ferrocyanide, copper (II) ferrocyanide, and zinc (II) ferrocyanide.

3. The positive electrode according to claim 1, wherein the transition metal-ferrocyanide compound comprises iron (III) ferrocyanide.

4. The positive electrode according to claim 1, wherein the transition metal-ferrocyanide compound has a water content of 10% by weight or less.

5. The positive electrode according to claim 1, wherein the transition metal-ferrocyanide compound has a lattice structure, and is vacuum-dried to remove moisture in the lattice structure.

6. The positive electrode according to claim 1, wherein the porous carbon material comprises at least one selected from the group consisting of graphite, graphene, carbon black, carbon nanotubes, carbon fibers, graphite and activated carbon.

7. The positive electrode according to claim 1, wherein the sulfur comprise at least one selected from the group consisting of inorganic sulfur, $Li_2S_n$ where $n \geq 1$, disulfide compounds, organosulfur compounds, and carbon-sulfur polymers $(C_2S_x)_n$ where $x = 2.5$ to 50, and $n \geq 2$.

8. The positive electrode according to claim 1, wherein the sulfur is contained in an amount of 65 to 90% by weight based on 100% by weight of the total of the sulfur-carbon composite.

9. The positive electrode according to claim 1, wherein the positive electrode has a loading amount of sulfur of 6 to 8 mg/cm$^2$.

10. A lithium-sulfur battery comprising the positive electrode according to claim 1; a negative electrode; and an electrolyte.

* * * * *